Feb. 21, 1939.　　　V. BOTTKER　　　2,147,633
SHRIMP-SHELLING MACHINE
Filed April 20, 1936　　　2 Sheets-Sheet 1
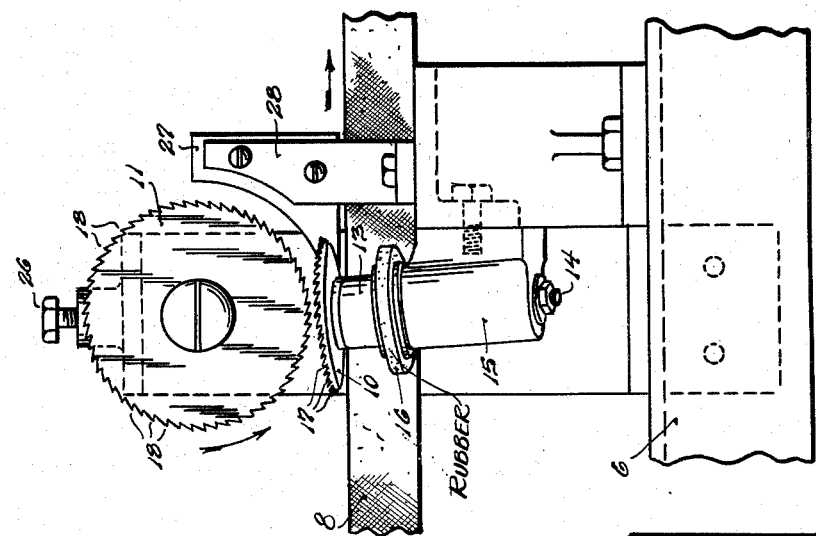
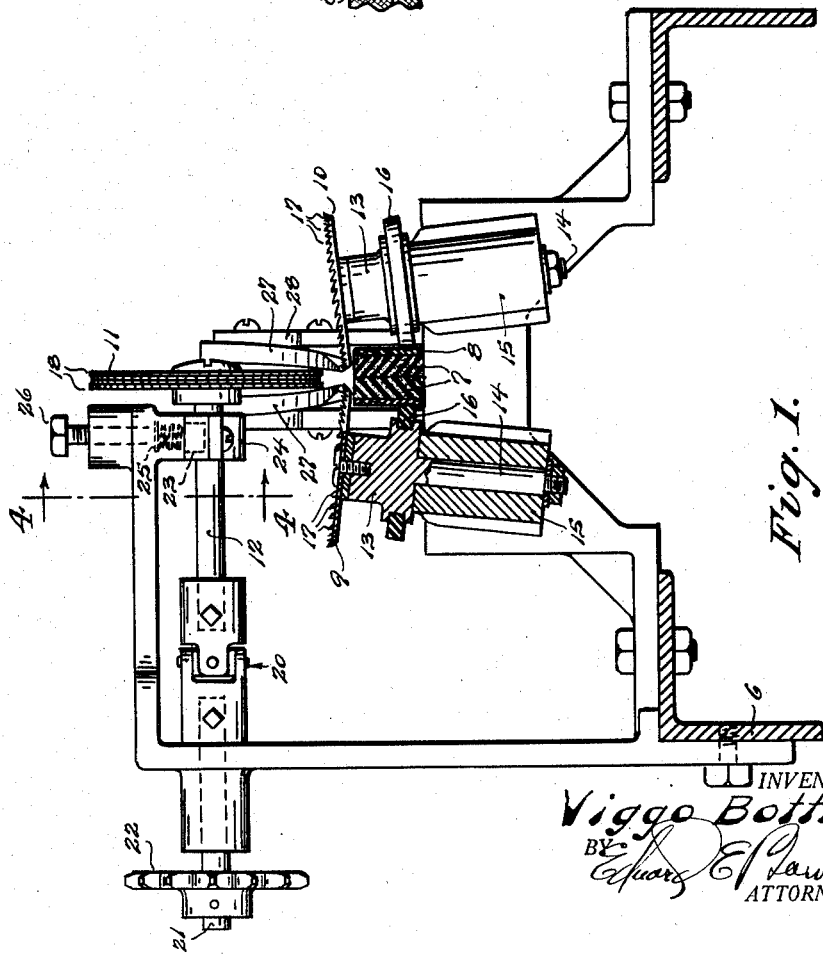
INVENTOR.
Viggo Bottker
ATTORNEY Feb. 21, 1939.　　V. BOTTKER　　2,147,633
SHRIMP-SHELLING MACHINE
Filed April 20, 1936　　2 Sheets-Sheet 2
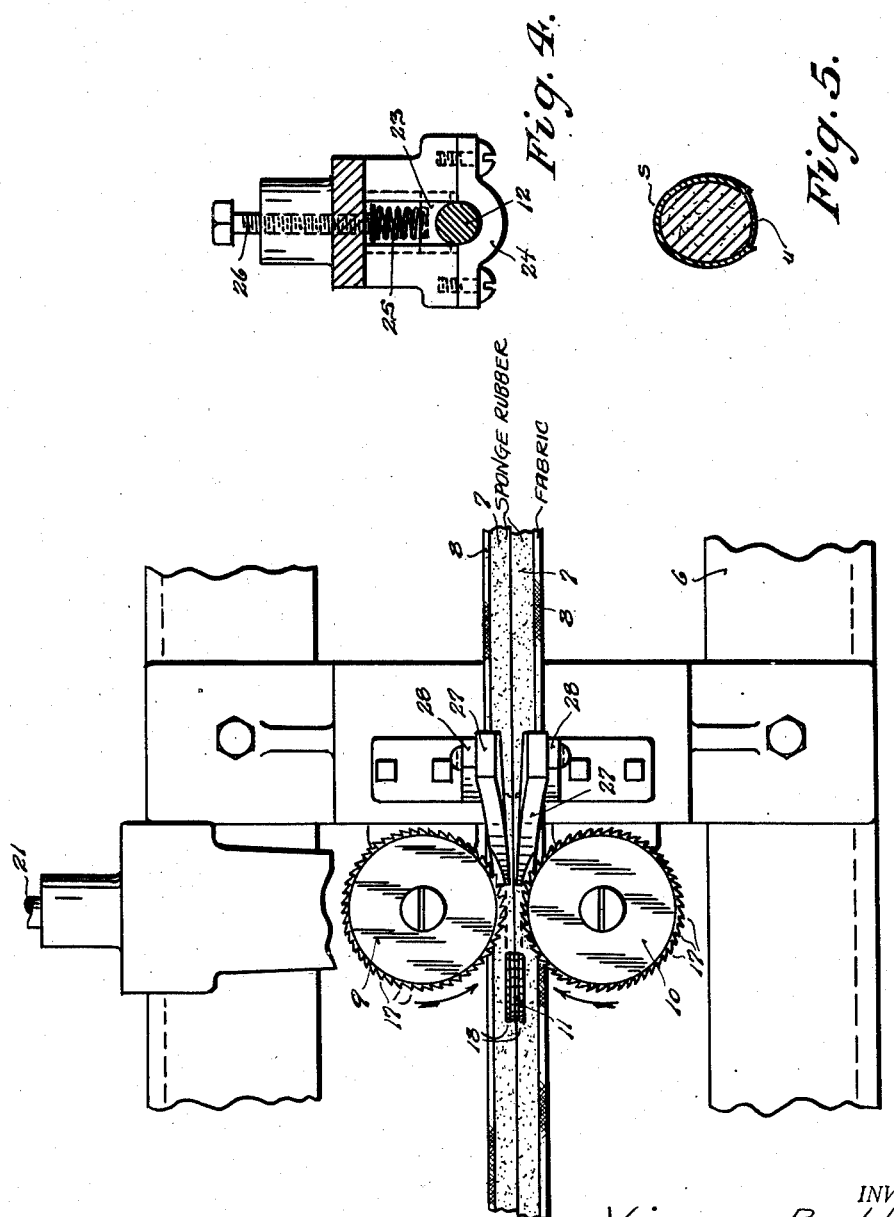
INVENTOR.
Viggo Bottker Patented Feb. 21, 1939

2,147,633

UNITED STATES PATENT OFFICE 2,147,633

SHRIMP-SHELLING MACHINE

Viggo Bottker, Seattle, Wash.

Application April 20, 1936, Serial No. 75,390

20 Claims. (Cl. 17—2)

This invention relates to shrimp-shelling mechanism adapted particularly to the removal of the shell from the anterior portion of shrimp, the invention being directed to improvements over prior structure to this end jointly conceived by myself and Bjarne Grondahl and illustrated and described in application for Letters Patent of the United States, Serial Number 702,853, filed December 18, 1933, said application having matured into Letters Patent of the United States No. 2,034,691, of March 24, 1936.

Stated generally, the object of the present invention is to most advantageously remove the shrimp shell from the head and thorax portion by especially simplified and perfected mechanism so constituted as to eliminate possibility of any portion of such anterior shell remaining on the shrimp meat following the shelling operation.

More particular objects and advantages, together with the foregoing, will become apparent in the course of the following detailed description and in the claims annexed thereto, the invention consisting in the novel construction, adaptation, and combination of parts hereinafter described and claimed.

In the drawings:—

Figure 1 is a transverse vertical section taken through a shrimp-shelling machine employing the improvements constituting the present invention.

Fig. 2 is a side elevational view and Fig. 3 a top plan view thereof with the conveyor structure and framework of the machine shown fragmentarily.

Fig. 4 is an enlarged detail longitudinal vertical section taken on the line 4—4 of Fig. 1; and Fig. 5 is a sectional view illustrating the general form of a shrimp, reference being had to the figure in clarifying the operation of the machine.

In said drawings the framework of the machine is designated by the numeral 6, said machine, while not shown, being provided at each side of the longitudinal median line with pairs of horizontally aligned and longitudinally spaced rollers revoluble about vertical axes and receiving the indicated endless belts 7 in a manner to obtain contactual engagement thereof between the transverse diametrical center lines of the rollers. Said belts desirably are composed of sponge rubber and on the inner or pulley-engaging surfaces are provided with a liner 8 of fabric tape or the like, the belts acting as conveyors for the shrimp with the posterior or tail portions of the same being introduced and frictionally engaged between the belts. Travel of the belts is effected by suitable connection which desirably comprises a driven chain engaging sprocket wheels carried by the roller-supporting shafts.

The conveyor belts, a feed belt thereto, and a means of driving the same are clearly illustrated in the above referred to Letters Patent of the United States and according to the present invention, the anterior portions of the shrimp which lie above the belts are exposed to shell-stripping mechanism comprising a toothed wheel 11 fixedly mounted on a driven horizontal shaft 12 to locate the wheel above the belts and in the path of travel of the shrimp, and co-active laterally disposed toothed disks 9 and 10 disposed below the wheel with their inner portions extending into the path of travel of the shrimp.

Said disks 9 and 10 are revolubly supported by hub elements 13 which are or may be formed integral with arbors 14 received in bearings 15, the hub elements being circumferentially channeled for the seating reception of rubber rings 16 acting to frictionally engage the belts 7 for driving the disks. As disclosed in and best understood from an inspection of the drawings, said arbors 14 lie in inclined planes both in side and end elevation in a manner to revolubly support the disks in sloping planes whereby the teeth 17 which pass immediately above the surface of the belts rise progressively as the same engage and travel longitudinally with the shrimp. Said shrimp-engaging teeth are directed outwardly and upwardly and incline in the direction of the shrimp travel to obtain a relative hooking action as the same are successively forced into penetrating engagement to the shell of the shrimp.

As respects the toothed wheel 11, the teeth 18 of which similarly incline in the direction of the shrimp travel, the same is desirably of a laminate form comprised of a plurality of outer denticulated disks superposed over inner denticulated disks of reduced diameter whereby to render the wheel relatively concave in edge elevation conforming generally to the curvature of the shrimp shell, the supporting shaft 12 for said wheel connecting through a universal joint 20 with a shaft 21 on which is a sprocket wheel 22 receiving a chain from a source of power common to the belts 9 and 10, said belts and the teeth 18 being driven at a relatively uniform speed. The outer end of shaft 12 is received in a bearing comprised of a sliding block 23 and a fixed cap 24 to allow vertical movement of the wheel 11, a compression spring 25 engaging the block to yieldably depress the same. 26 indicates a screw for adjusting the spring tension.

In the operation of shelling the shrimp, the shell about the posterior or tail of the shrimp is or may be removed by pressure mechanism of the character illustrated in said U. S. Patent No. 2,034,691; or by stripping mechanism employing a cam-actuated flexible disk, one embodiment of which is illustrated in earlier U. S. Patent No. 1,777,069 of September 30, 1930, also issued to myself and said Bjarne Grondahl. Such operation of removing the tail shell may be performed either in advance of or following the removal of the anterior shell. Having particular reference to the latter operation, the tail portion of the shrimp is introduced by suitable delivery devices between the belts 7 to expose the head and thorax of the shrimp above the belts. As such exposed portion of the shrimp is fed to the described stripping mechanism, the vertical wheel 11 is positioned according to the size of the shrimp through a spring-opposed elevation of the shaft 12, the spring pressure forcing the teeth 18 into the upper crust of the shrimp indicated by the letter s and depressing the shrimp against the teeth 17 of the disks 9 and 10 to obtain a simultaneous perforation by the latter of the side edges of the relatively thin membranous tissue $u$ which extends from the lower margins of the crust across the underpart of the shrimp. As the shrimp travels longitudinally, said latter teeth effect a ripping action upon the tissue $u$ and pull the lower edges of the crust s laterally to draw the same from the sides of the shrimp meat. Coincident with the action of spreading the crust edges, the teeth 18 travel upwardly about the shaft 12 as an axis to lift the shell from the shrimp meat, the shell being hooked thereby and withdrawn from the teeth 17 as the same recede laterally. The inclination of the disks 9 and 10 to obtain a progressive rise of the teeth 17 in the initial lateral travel of the same serves to prevent the shrimp shell from becoming dislodged from teeth 17 in advance of the point at which the shell is lifted from the meat of the shrimp.

To co-act with teeth 18 in guiding the shell upwardly as the shell is stripped from the shrimp meat, the invention provides arcuate plate elements 27 supported by bracket arms 28 to lie at each side of the path of travel of the shrimp and to the rear of the wheel 11. Also provided are nozzles which, while not shown in the drawings, are located in suitable positions to play water jets over the stripping teeth for dislodging the shrimp shell as the same is carried over the wheel 11, said nozzles being supplied from a pressure source of water supply.

The invention is believed clear from the foregoing, it being understood, however, that no limitations are implied other than as may appear in the hereto annexed claims.

What I claim, is:—

1. In mechanism for removing the shell from shrimp, means acting to sever the under tissue of the shrimp shell and spread the sides of the upper crust to separate the crust sides from the meat of the shrimp, and means co-active therewith for lifting the expanded crust from the shrimp meat.

2. In mechanism for removing the shell from shrimp, means acting to penetrate the under tissue of the shrimp shell and pull the same laterally from each side of the shrimp meat for drawing the side edges of the shrimp's upper crust from the meat of the shrimp; and means acting to penetrate the upper crust of the shell to lift the entire upper crust from the shrimp meat.

3. In mechanism for removing the shell from shrimp, shell-penetrating means acting to engage the under tissue of the shrimp shell and movable laterally from each side of the shrimp to sever the under tissue and spread the sides of the shrimp shell, and shell-penetrating means movable in a plane relatively at right angles to said first-named means acting to engage the upper crust of the shrimp shell to lift the shell from the shrimp meat.

4. Shrimp-shelling mechanism comprising means for performing in sequence the following operations: (1) perforating the under tissue of the shrimp shell and (2) severing the perforated under tissue, and means for stripping the upper crust from the meat of the shrimp.

5. Shrimp-shelling mechanism comprising, in combination with shrimp-carrier devices, shell-penetrating means movable in a vertical plane into and from the path of travel of the shrimp to engage the upper crust of the shrimp shell for lifting the shell from the meat of the shrimp, and shell-penetrating means disposed at opposite sides of the path of travel of the shrimp and movable in planes relatively at right angles to the plane of movement of said first-named means into and from the path of travel of the shrimp to engage the underside of the shrimp shell for severing the under tissue and spreading the sides of the upper crust, said last-named means in the initial shell-spreading action of the same being afforded a slight elevational movement conforming to the shell-stripping rise of the first-named means to prevent said first-named means from dislodging the shell from the expanding means in advance of the shell-stripping action.

6. In mechanism for removing the shell from shrimp, a revoluble wheel provided about the periphery of the same with stripping teeth, and means for conveying the shrimp through a plane constituting a relative tangent of the wheel into operative engagement with the teeth to obtain a penetration by said teeth of the shrimp crust to lift the shell from the shrimp meat in response to revoluble travel of the teeth.

7. Shrimp-shelling mechanism comprising a revoluble wheel provided about the periphery of the same with stripping teeth, means for conveying the shrimp through a plane constituting a relative tangent of the wheel into operative engagement with the teeth to obtain a penetration of the shrimp crust to lift the crust from the meat of the shrimp in response to revoluble travel of the teeth, and means acting simultaneously with said lifting action for severing the under tissue of the shrimp shell.

8. In mechanism for removing the shell from shrimp, a revoluble wheel formed to a relative concave configuration in edge elevation and provided about the periphery of the same with shell-penetrating teeth, and carrier devices for the shrimp acting to convey the shrimp in a plane constituting a relative tangent of the wheel into operative engagement with the teeth for stripping the shell from the shrimp in response to revoluble movement of the teeth from the plane of the shrimp travel.

9. Shrimp-shelling mechanism comprising a wheel mounted for revoluble movement and provided about the periphery of the same with shell-penetrating teeth, and shrimp-carrier devices for conveying the shrimp relatively tangentially of the wheel into operative engagement with the teeth of said wheel for stripping the shell from the shrimp in response to revoluble movement of the teeth from the plane of the shrimp travel, said carrier devices supporting the shrimp to expose the median portion of the back to the stripping teeth.

10. Shrimp-shelling mechanism comprising shrimp-carrier devices, shell-penetrating teeth supported for revoluble movement about a floating axis into and from the path of travel of shrimp carried by said carrier devices, and means for driving said teeth at a speed relatively the same as the speed of travel of the shrimp with the carrier devices into penetrating engagement with the shell of shrimp conveyed past said teeth for stripping the shell from the shrimp coincidentally with the travel of the shrimp.

11. Shrimp-shelling mechanism comprising shrimp-carrier devices, disks at each side of the carrier devices provided with peripheral teeth movable into and from the path of travel of the shrimp to engage in the under tissue of the shrimp shell and spread the sides of the upper crust of the shell coincident with the travel of the shrimp past the disks, said disks having an upward inclination rising from the plane of the carrier devices in the direction of shrimp travel to elevate the teeth progressively with the spreading action of the same, and means engaging said disks for driving the teeth at a speed relatively the same as the speed of travel of the shrimp with the carrier devices.

12. In a shrimp-shelling machine, in combination with conveyor devices supported for movement in a relative horizontal plane longitudinally of the machine frame and acting to grip the posterior portion of the shrimp to expose the anterior portion above the conveyor devices, means supported in the path of travel of said exposed anterior portion for removing the anterior shell, said means comprising a wheel located above the conveyor devices revolubly supported for movement in the vertical plane of the shrimp travel and a pair of disks located to each side of the path of travel of the shrimp and revolubly supported for movement in planes slightly inclined from the horizontal, said wheel and disks providing peripheral teeth movable into and from the path of travel of the exposed anterior portion of the shrimp to penetrate the upper crust and the under tissue of the shrimp, respectively, said disk teeth acting to sever the perforated under tissue and spread the sides of the upper crust and the teeth of said wheel acting to simultaneously lift the shell to strip the same from the meat of the shrimp, the inclination of the disks affording a progressive rise of the teeth thereof in the shell-spreading action of the same to prevent dislodgment of the shell from said teeth in advance of the stripping action of the wheel teeth.

13. In a shrimp-shelling machine, conveyor devices supported for movement longitudinally of the machine frame and acting to grip the posterior portion of the shrimp to expose the anterior portion, a peripherally toothed member revolubly supported above the conveyor devices for movement of the teeth thereof into and from the path of travel of the exposed anterior portion of the shrimp to penetrate the upper crust of the shrimp shell, peripherally toothed members revolubly supported at each side of the conveyor devices for movement of the teeth thereof into and from the path of travel of the exposed anterior portion of the shrimp to penetrate the under tissue of the shrimp shell adjacent the marginal limits of the upper crust, and means for actuating said toothed members for driving the teeth in the direction of shrimp travel at a speed relatively the same as the speed of travel of the shrimp with the conveyor devices.

14. The shrimp-shelling mechanism as defined in claim 13 wherein said first-named toothed member is revoluble about a floating axis, and spring means for yieldably influencing the same into engagement with the shell of the shrimp.

15. Shrimp-shelling mechanism comprising shrimp-carrier devices, and means movable laterally from each side of the shrimp carried by said devices operating to sever the under tissue and spread the sides of the shrimp shell.

16. In shrimp-shelling mechanism, means acting to sever the under tissue of the shrimp shell and spread the sides of the upper crust to separate the crust sides from the meat of the shrimp.

17. In shrimp-shelling mechanism, means operating to support the shrimp, and means associated with said shrimp-supporting means and acting in the median longitudinal vertical plane of the supported shrimp for penetrating the shrimp shell and stripping the same from the body of the shrimp.

18. In shrimp-shelling mechanism, means acting to sever the two sides of the shrimp shell by penetrating the under tissue of the same, and means associated therewith for stripping the severed shell from the body of the shrimp.

19. The method of removing the shell from the body of a shrimp which consists in separating the two sides of the shrimp shell by penetrating the under tissue of the same, and stripping the separated shell by lifting the same from the body of the shrimp.

20. The method of removing the shell from the body of a shrimp which consists in separating the two sides of the shrimp shell by penetrating the under tissue of the same, drawing the two separated edges laterally to loosen the shell sides from the shrimp body, and lifting the loosened shell from the shrimp body.

VIGGO BOTTKER.